US012801323B2

(12) United States Patent
Chien et al.

(10) Patent No.: US 12,801,323 B2
(45) Date of Patent: Nov. 17, 2026

(54) BRIGHTNESS ADJUSTMENT METHOD AND VIRTUAL REALITY DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Cheng-Ching Chien, New Taipei (TW); Yu-Zhong Feng, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 19/180,382

(22) Filed: Apr. 16, 2025

(65) Prior Publication Data

US 2026/0119103 A1 Apr. 30, 2026

(30) Foreign Application Priority Data

Aug. 30, 2024 (CN) ......................... 202411222172.3

(51) Int. Cl.

*G06F 3/14* (2006.01)
*G02B 27/01* (2006.01)
*G06T 7/90* (2017.01)

(52) U.S. Cl.

CPC ........... *G06F 3/14* (2013.01); *G02B 27/0172* (2013.01); *G06T 7/90* (2017.01)

(58) Field of Classification Search

CPC .......... G06F 3/14; G06T 7/90; G02B 27/0172
See application file for complete search history.

(56) References Cited

U.S. PATENT DOCUMENTS

2014/0192247 A1* 7/2014 Cheong .................. G06F 3/016 348/333.11
2015/0358539 A1* 12/2015 Catt .......................... G06T 5/80 348/38
2021/0283496 A1* 9/2021 Mandella ............... H04N 23/60
2025/0166537 A1* 5/2025 Park ................... G02B 27/0172

* cited by examiner

*Primary Examiner* — Stacy Khoo
(74) *Attorney, Agent, or Firm* — ScienBiziP, P.C.

(57) ABSTRACT

Disclosed in the present application are a brightness adjustment method and a virtual reality device. The brightness adjustment method is applied to the virtual reality device. The virtual reality device includes a display module and a camera module, the display module is configured to display an environmental scene, the environmental scene comprises a real environment and a real object, the brightness adjustment method includes: capturing images through the camera module, obtaining multiple brightness data of the environmental scene according to the images, and adjusting display brightness of the display module according to the multiple brightness data.

17 Claims, 9 Drawing Sheets

BRIGHTNESS ADJUSTMENT METHOD AND VIRTUAL REALITY DEVICE

FIELD

The present application relates to the field of virtual reality technology, and specifically to a brightness adjustment method and virtual reality device.

BACKGROUND

With the development of virtual reality technology, virtual reality devices have been more widely used, the virtual reality device is provided with a display module, in order to increase the immersion of the user, the brightness of the display module needs to be adapted according to the environmental brightness, the virtual display device usually use the environmental light sensor to collect environmental brightness. However, the environmental light sensor has a small acquisition range and may only obtain a single integrated brightness value, and thus the brightness adjustment of the display module is less accurate and does not match the environmental brightness well, reducing the user experience.

Therefore, improvement is desired.

SUMMARY

In order to solve the above problems, the present application provides a brightness adjustment method and a virtual reality device, the present application may increase the collectible range of environmental light intensity and may obtain multiple environmental brightness values, so as to improve the brightness adjustment accuracy and sensitivity of the display module and enhance the user experience.

In a first aspect, the present application provides a brightness adjustment method, the brightness adjustment method may be applied to a virtual reality device, the virtual reality device includes a display module and a camera module, the display module is configured to display an environmental scene, the environmental scene comprises a real environment and a real object, the brightness adjustment method includes: capturing images through the camera module, obtaining multiple brightness data of the environmental scene according to the images, and adjusting display brightness of the display module according to the multiple brightness data.

Optionally, wherein the adjusting display brightness of the display module according to the multiple brightness data, includes: dividing an imaging range of the camera module into multiple imaging areas; dividing a display area of the display module into multiple display areas according to the multiple imaging areas; and adjusting the display brightness of the multiple display areas corresponding to the multiple brightness data of the environmental scene in the multiple imaging areas.

Optionally, the brightness adjustment method further includes: obtaining motion data of the virtual reality device; determining a target imaging range that the camera module is projected to move to according to the motion data; obtaining one or more target imaging areas corresponding to the target imaging range from the multiple imaging areas; and obtaining one or more target display areas corresponding to one or more target imaging areas.

Optionally, wherein the adjusting display brightness of the display module according to the multiple brightness data, further includes: adjusting the display brightness of one or more target display areas according to the brightness data of the one or more target imaging areas.

Optionally, wherein before obtaining the multiple brightness data of the environmental scene according to the images, the brightness adjustment method further includes: capturing test images of a single-intensity environmental scene through the camera module; and establishing mapping relationships between detection brightness values and actual brightness values for each pixel in the test images.

Optionally, wherein the obtaining the multiple brightness data of the environmental scene according to the images, further includes: capturing real-time images of the environmental scene through the camera module; obtaining multiple actual brightness values of the environmental scene according to the detection brightness values of each pixel in the real-time images and the mapping relationships; applying the multiple actual brightness values as multiple brightness data.

In a second aspect, the present application provides a virtual reality device, the virtual reality device includes a display module, a camera module, and a processing module, the display module is configured for displaying an environmental scene, wherein the environmental scene comprises a real environment and a real object, the camera module is configured for capturing images through the camera module, and the processing module is configured for obtaining multiple brightness data of the environmental scene according to the images and adjusting display brightness of the display module according to the multiple brightness data.

Optionally, the processing module is further configured to: divide an imaging range of the camera module into multiple imaging areas; divide a display area of the display module into multiple display areas according to the multiple imaging areas; and adjust the display brightness of the multiple display areas corresponding to the multiple brightness data of the environmental scene in the multiple imaging areas.

Optionally, the virtual reality device further comprises an inertial measurement module, the inertial measurement module is configured to detect the movement trend of the virtual reality device; the processing module is further configured to: detect a movement trend of the virtual reality device by the inertial measurement module to obtain motion data of the virtual reality device; obtain a target imaging range that the camera module is projected to move to according to the motion data; obtain one or more target imaging areas corresponding to the target imaging range from the multiple imaging areas; and obtain one or more target display areas corresponding to one or more target imaging areas.

Optionally, the processing module is further configured to: adjust the display brightness of one or more target display areas according to the brightness data of the one or more target imaging areas.

Optionally, the processing module is further configured to: capture test images of a single-intensity environmental scene through the camera module; and establish mapping relationships between detection brightness values and actual brightness values for each pixel in the test images.

Optionally, the processing module is further configured to: capture real-time images of the environmental scene through the camera module; obtain multiple actual brightness values of the environmental scene according to the detection brightness values of each pixel in the real-time images and the mapping relationships; apply the multiple actual brightness values as multiple brightness data.

Optionally, the virtual reality device further includes a housing, the display module and the camera module are disposed on the housing, the camera module includes two cameras, the two cameras are spaced apart from the display module, and the two cameras are respectively disposed on the housing on both sides of the display module.

Optionally, each of the two cameras is an ultra-wide angle cameras.

DETAILED DESCRIPTION

The technical solutions in the embodiments of the present application will be described below in conjunction with the accompanying drawings in the embodiments of the present application, and the embodiments described are only a portion of the embodiments of the present application and not all of them.

In the description of the embodiments of the present application, the technical terms "first," "second," and the like are only used to distinguish different objects, and are not to be construed as indicating or implying relative importance, or implicitly specifying the number, specific order, or primary-secondary relationship of the indicated technical features. In the description of the embodiments of the present application, "more than one" means more than two, unless otherwise expressly and specifically limited.

With the development of virtual reality technology, virtual reality devices have been more widely used, the virtual reality device is provided with a display module, in order to increase the immersion of the user, the brightness of the display module needs to be adapted according to the environmental brightness, the virtual display device usually use the environmental light sensor to collect environmental brightness. However, the environmental light sensor has a small acquisition range and may only obtain a single integrated brightness value, and thus the brightness adjustment of the display module is less accurate and does not match the environmental brightness well, reducing the user experience.

The present application provides a brightness adjustment method and a virtual reality device, which may increase the collectible range of environmental light intensity and may obtain a plurality of environmental brightness values, so as to improve the brightness adjustment accuracy and sensitivity of the display module and enhance the user experience.

Figure 1:
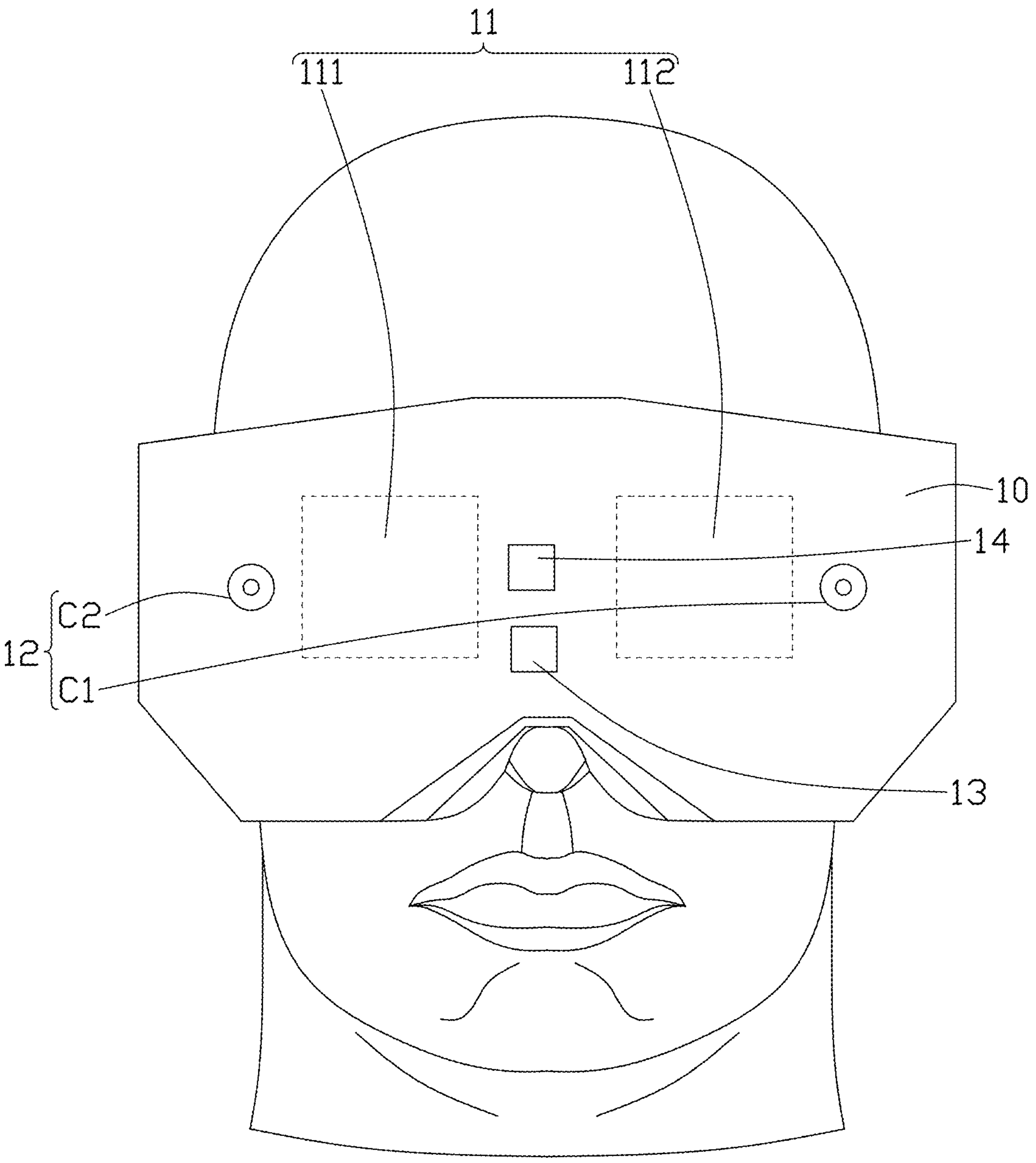
FIG. 1 is a schematic diagram of an embodiment of a virtual reality device according to the present application.

FIG. 1 illustrates a virtual reality device 10 in accordance with an embodiment of the present application.

The virtual reality device 10 includes a display module 11, a camera module 12, a processing module 13, an inertial measurement module 14, and a housing 15. The display module 11 and the camera module 12 are disposed on the housing 15.

In some embodiments, the virtual reality device 10 may include smart glasses, head-mounted displays, split virtual display devices, and other devices applying at least one of virtual reality (VR), augmented reality (AR), mixed reality (MR), extended reality (ER), and derived, improved techniques of any of the above techniques. The virtual reality device 10 is illustrated as an example of the smart glasses, the present application does not limit the specific types and application technologies of the virtual reality device 10.

The display module 11 is used to display an environmental scene and a virtual scene. The environmental scene is a real environment and an object around the user, and the virtual scene is a fictional environment and a fictional object. The display module 11 may display only the environmental scene or the virtual scene. The display module 11 may also display both the environmental scene and the virtual scene, and the display module 11 may display the scene after the environmental scene and the virtual scene are superimposed, fused, spliced, combined, and other operations. The present application does not limit the specific contents, scene types, and display methods of the plurality of scenes displayed by the display module 11.

In some embodiments, the type of the display module 11 may be adaptively configured according to the display technology applied by the virtual reality device 10. The display technology may include video see through (VST) technology, optical see through (OST), and derived, improved techniques of any of the above techniques. For example, when the virtual reality device 10 applies VST technology, the display module 11 may be an opaque display screen, such that the environmental scene is displayed on the display module 11 by projection mapping. When the virtual reality device 10 applies OST technology, the display module 11 may be a transparent display, such that the environmental scene may be directly observed by the naked eye of the user.

In some embodiments, the display module 11 may include at least one screen. For example, the display module 11 may include one screen, the size of the screen may be set according to the visual range of the user, the user may observe all environmental scenes within the visual range through the single screen. As another example, the display module 11 may include two screens, the two screens may correspond to the left eye of the user and the right eye of the user respectively, so that the user may observe all environmental scenes within the visual range through the corresponding two screens. Taking the example of the display module 11 including a first display screen 111 and a second display screen 112, the first display screen 111 is set relative to one eye of the user, and the second display screen 112 is set relative to another eye of the user.

In some embodiments, the screen type of the display module 11 may be at least one of LCD, LED, OLED, mini-LED, micro-LED, and other types derived or modified from LED or LCD.

The processing module 13 is used to output a display signal to the display module 11, so that the display module 11 displays the corresponding content according to the display signal. The corresponding content may include text, images, video, a user interaction interface of an application, and a virtual scene.

In some embodiments, the corresponding content may also include other content. For example, when the virtual reality device 10 applies VST technology, the processing module 13 may also output a corresponding display signal, so that the display module 11 displays a real-time environmental scene around the user.

In some embodiments, the processing module 13 may also output a control signal to the display module 11 to control the operating parameters of the display module 11. For example, the processing module 13 may output corresponding control signals to the display module 11 to adjust the display parameters such as brightness, color temperature, and contrast of display module 11. For another example, the processing module 13 may output corresponding control signals to the display module 11 to control operating states such as start-up/standby/shutdown/normal operation of the display module 11.

In some embodiments, the setting of the processing module 13 may be set flexibly. The processing module 13 is provided between the first display screen 111 and the second display screen 112, and the processing module 13 is set at intervals with the first display screen 111 and the second display screen 112 as an example for illustration, but the present application does not make any limitation on the setting position of the processing module 13.

In some embodiments, the processing module 13 may include a processor, the processor is used to output the corresponding display signals and the control signals. The processing module 13 may also include a memory, the memory is used to store various types of data.

The camera module 12 is used to capture images and/or videos and transmit the captured images and/or videos to the processing module 13. The processing module 13 may perform corresponding image processing and/or video processing on the images and/or videos captured by the camera module 12. For example, the processing module 13 may perform images and/or videos analysis on the images and/or videos captured by the camera module 12 that include the user operation gestures, to obtain the corresponding user operation gestures, and then output a control signal and/or a display signal to the display module 11 in accordance with the user operation gestures, so that the display module 11 displays the content corresponding to the user-operated gesture. The user operation gestures include swiping, flicking, two-finger pinching, three-finger grasping, dragging, sliding the wrist, and the content corresponding to user operation gestures may include button clicking, application interaction interface and/or image/video closing, zooming in, zooming out, moving. For another example, the processing module 13 may perform images and/or videos analysis on the images and/or videos including the environmental scene captured by the camera module 12 to obtain a corresponding environmental scene, and then output a control signal and/or a display signal to the display module 11 according to the environmental scene, so that the display module 11 may display the corresponding environmental scene. For another example, the processing module 13 may perform a brightness compensation process on the images and/or videos captured by the camera module 12, thereby calibrating the light sensitivity values of the camera module 12 to reduce light sensitivity differences between different pixel points of the image sensor in the camera module 12.

The processing module 13 may also output corresponding control signals to the camera module 12 to control the operating parameters of the camera module 12. For example, the processing module 13 may output the corresponding control signals to the camera module 12 to adjust the focal length, the exposure value, the aperture size, the camera angle of the camera module 12. For another example, the processing module 13 may output the corresponding control signals to the camera module 12, to control operating states such as start-up/standby/shutdown/normal operation of the camera module 12.

In some embodiments, the number, location, and type of the camera modules 12 may be flexibly configured according to actual needs. For example, in order to satisfy the need for complete coverage of the user's field of vision by the camera range, the camera module 12 may include one ultra-wide angle camera or two or more wide angle cameras. For another example, to satisfy the requirements of color perspective, the camera module 12 may include one or more color perspective cameras, taking the example of the camera module 12 including two ultra-wide angle cameras. The two ultra-wide angle cameras are respectively a first camera C1 and a second camera C2, and the first camera C1 and the second camera C2 are respectively disposed on one side of the first display screen 111 and the second display screen 112 back from each other. In other words, the first camera C1 and the second camera C2 are respectively disposed on the housing 15 on both sides of the first display screen 111 and the second display screen 112. Field of View (FOV) of the first camera C1 is greater than 100 degrees, and FOV of the second camera C2 is greater than 100 degrees.

The inertial measurement module 14 is used to acquire the attitude angle and acceleration of a corresponding part of the user wearing or using the virtual reality device 10 and transmit the acquired attitude angle and acceleration to the processing module 13. For example, if the virtual reality device 10 is smart glasses and the part of the user wearing the smart glasses is the head, the inertial measurement module 14 may acquire the attitude angle and acceleration of the user's head and transmit the attitude angle and acceleration of the user's head to the processing module 13. The processing module 13 may acquire the movement trend of the user's head based on the attitude angle and acceleration and adjust the display brightness of the display module 11 accordingly according to the movement trend of the user's head, so that the display brightness of the display module 11 changes synchronously with the movement trend of the user's head. As such, the dynamic adaptability of the display module 11 may be improved, and the user's experience may be enhanced.

In some embodiments, the virtual reality device 10 may also include an environmental light sensor configured to obtain multiple brightness data of the environmental scene and obtain a comprehensive brightness value based on the multiple brightness data, wherein the comprehensive brightness value may be an average value of the multiple brightness data. The environmental light sensor is also used to transmit the comprehensive brightness value to the processing module 13. Thus, the processing module 13 may adjust the brightness of the display module 11 corresponding to the comprehensive brightness value.

The following describes the working principle of the virtual reality device 10 provided by the present application in detail.

The camera module 12 is also configured to obtain multiple brightness data of the environmental scene and transmit them to the processing module 13. Compared with the environmental light sensor, the first camera C1 and the second camera C2 in the camera module 12 have a larger FOV, thus may collect more brightness data from a larger range of environmental scenes. As such, the multiple brightness data collected by the camera module 12 are more accurate and may better reflect the light and dark conditions of the environmental scene in a larger range. Meanwhile, compared with the environmental light sensor that may only obtain a single comprehensive brightness value, both the first camera C1 and the second camera C2 in the camera module 12 include image sensors with multiple pixels, where the brightness value of each pixel represents the brightness of the corresponding position in the environmental scene. Therefore, the processing module 13 may obtain the brightness of multiple corresponding positions in the environmental scene based on the brightness values of multiple pixels. As such, the multiple brightness data collected by the camera module 12 may better reflect the light and dark distribution and variation in the environmental scene over a larger range.

The processing module 13 may perform brightness calibration on the camera module 12. Specifically, a light-emitting panel with uniform light emitting intensity is placed in front of one of the cameras in the camera module 12, for example, the first camera C1, where the light emitting intensity of the light-emitting panel is L. The light-emitting panel covers the entire imaging range of the first camera C1. As such, the brightness value of each pixel on the image sensor of the first camera C1 should all be the brightness value corresponding to the light emitting intensity L. At this time, the processing module 13 may receive the brightness value of each pixel on the image sensor of the first camera C1 and establish mapping relationships between this brightness value and the light emitting intensity L. By adjusting the value of light emitting intensity L, the mapping relationships between the brightness value of each pixel and each different light emitting intensity L may be obtained to complete the brightness calibration. Thereafter, the processing module 13 may obtain the actual light emitting intensity sensed by the pixel based on the brightness value of each pixel and its mapping relationships with the light emitting intensity.

The processing module 13 may adjust the brightness of different areas of the display module 11 corresponding to the multiple brightness data. Specifically, the processing module 13 may partition the environmental scene and the display screen, and establish the mapping relationships between the partitions of the environmental scene and the partitions of the display screen, and generate brightness mapping relationships between the brightness data and the partitions of the display screen based on the mapping relationships between the partitions of the environmental scene and the partitions of the display screen and the multiple brightness data, thereby adjusting the brightness of different partitions of the display screen corresponding to the brightness mapping relationships between the brightness data and the partitions of the display screen. The multiple brightness data may represent the brightness of different partitions in the environmental scene.

For example, the first camera C1 is a camera correspondingly set for the first display screen 111, and the imaging range of the first camera C1 may be divided from left to right into a first imaging area a1, a second imaging area a2, and a third imaging area a3, corresponding to three position areas of the environmental scene within the imaging range of the first camera C1. The processing module 13 may divide the display area of the first display screen 111 from left to right into a first display area b1, a second display area b2, and a third display area b3. The area ratios of the first imaging area a1, second imaging area a2, and third imaging area a3 to the entire imaging range of the first camera C1 may correspondingly equal the area ratios of the first display area b1, the second display area b2, and the third display area b3 to the entire display area of the first display screen 111. Parameters such as the order, arrangement position, shape, whether overlapping and overlapping area of the first imaging area a1, the second imaging area a2, and the third imaging area a3 should correspond to those of the first display area b1, the second display area b2, and the third display area b3 respectively. As such, the processing module 13 may establish the mapping relationships between the first imaging area a1, the second imaging area a2, and the third imaging area a3 and the first display area b1, the second display area b2, and the third display area b3. Thereafter, the processing module 13 may adjust the brightness of the first display area b1 corresponding to the brightness data of the first imaging area a1, adjust the brightness of the second display area b2 according to the brightness of the second imaging area a2, and adjust the brightness of the third display area b3 according to the brightness of the third imaging area a3, the processing module 13 generates brightness mapping relationships between the brightness data and the partitions of the display screen, and adjusts the brightness of different partitions of the display screen corresponding to the brightness mapping relationships between the brightness data and the partitions of the display screen.

The processing module 13 may also adjust the brightness of different areas of the display module 11 corresponding to the attitude angle and acceleration obtained through the inertial measurement module 14 and multiple brightness data. More specifically, the processing module 13 may partition the environmental scene and the display screen, and establish the mapping relationships between the partitions of the environmental scene and the partitions of the display screen, and adjust the brightness of different partitions of the display screen corresponding to the mapping relationships between the partitions of the environmental scene and the partitions of the display screen, multiple brightness data, attitude angle and acceleration. The multiple brightness data may represent the brightness of different partitions in the environmental scene. The attitude angle and acceleration may reflect the movement trend of the corresponding part where the user wears or uses the virtual reality device 10. As such, the processing module 13 may predict the target range where the user's visible range will change based on the movement trend of the corresponding part where the user wears or uses the virtual reality device 10, and adjust the brightness of different partitions of the display screen corresponding to one or more partitions of the environmental scene corresponding to the target range, the mapping relationships between the one or more partitions and the partitions of the display screen, and multiple brightness data reflecting the one or more partitions.

For example, the first camera C1 is a camera correspondingly set for the first display screen 111, and the second camera C2 is a camera correspondingly set for the second display screen 112. The imaging range of the first camera C1 may be divided from left to right into a first imaging area a1, a second imaging area a2, and a third imaging area a3, corresponding to three position areas of the environmental scene within the imaging range of the first camera C1. The imaging range of the second camera C2 may be divided from left to right into a fourth imaging area a4, a fifth imaging area a5, and a sixth imaging area a6, corresponding to three position areas of the environmental scene within the imaging range of the second camera C2.

The processing module 13 may divide the display area of the first display screen 111 from left to right into a first display area b1, a second display area b2, and a third display area b3, and divide the display area of the second display screen 112 from left to right into a fourth display area b4, a fifth display area b5, and a sixth display area b6. The area ratios of the first imaging area a1, second imaging area a2, and third imaging area a3 to the entire imaging range of the first camera C1 may correspondingly equal the area ratios of the first display area b1, second display area b2, and third display area b3 to the entire display area of the first display screen 111. Parameters such as the order, arrangement position, shape, whether overlapping and overlapping area of the first imaging area a1, second imaging area a2, and third imaging area a3 should correspond to those of the first display area b1, second display area b2, and third display area b3 respectively. Similarly, the imaging range of the second camera C2 also corresponds to the display area of the second display screen 112. As such, the processing module 13 establishes the mapping relationships between the first imaging area a1, second imaging area a2, and third imaging area a3 and the first display area b1, second display area b2, and third display area b3, while also establishing the mapping relationships between the fourth imaging area a4, fifth imaging area a5, and sixth imaging area a6 and the fourth display area b4, fifth display area b5, and sixth display area b6. Since the imaging ranges of the first camera C1 and the second camera C2 may partially overlap, there may also be partial overlap between the first imaging area a1, the second imaging area a2, the third imaging area a3, fourth imaging area a4, the fifth imaging area a5, and the sixth imaging area a6. The processing module 13 may perform overall mapping between the sum of the imaging ranges of the first camera C1 and the second camera C2 and the sum of the display areas of the first display screen 111 and the second display screen 112, thereby establishing the mapping relationships between the partitions of the environmental scene and the partitions of the display screen.

Thereafter, the processing module 13 may obtain the movement trend of the corresponding part where the user wears or uses the virtual reality device 10 based on the attitude angle and acceleration, and further obtain the target range where the user's visible range will change to. The processing module 13 may thus map the target range to corresponding partitions of the display screen and adjust the brightness of the corresponding partitions of the display screen according to multiple brightness data representing the target range. As such, in application scenarios where the user is in motion, the processing module 13 may adjust the screen brightness in advance, allowing the brightness of the display module 11 to change with the user's movement trend, improving the user experience. If there are significant brightness differences between different areas in the environmental scene within the user's visible range, the processing module 13 may smoothly adjust the brightness of corresponding partitions of the display module 11 based on the attitude angle and acceleration, thereby reducing the discomfort caused by abrupt brightness adjustments when the user switches from brighter to darker environmental scenes.

Figure 2:
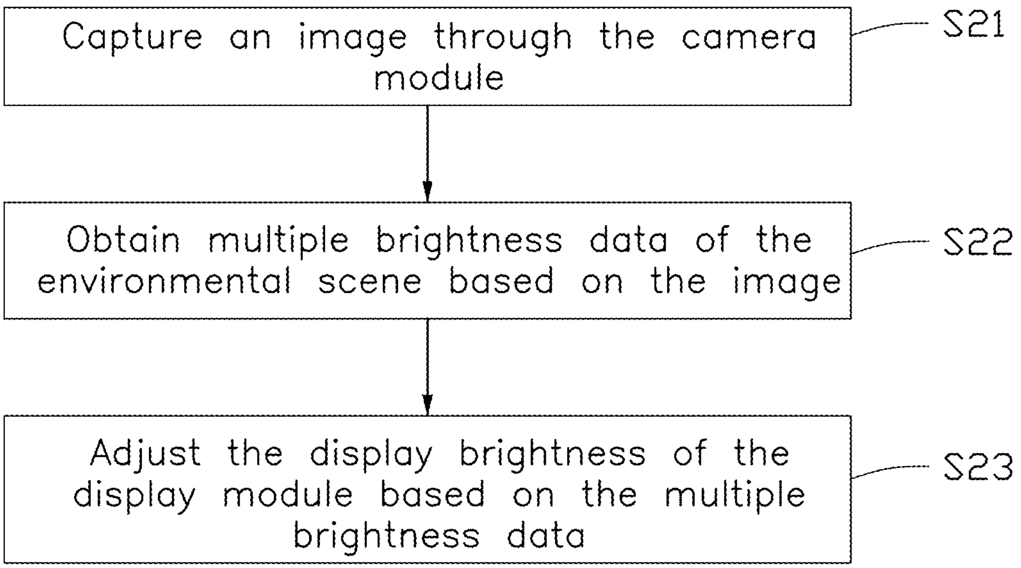
FIG. 2 is a flowchart of an embodiment of a brightness adjustment method according to the present application.

FIG. 2 is a flowchart of the brightness adjustment method for a virtual display device provided by the present application. The brightness adjustment method for the virtual display device may be applied to the virtual reality device 10 provided by the present application and executed by the processing module 13. The brightness adjustment method for the virtual display device may include the following steps.

At step S21: capture images through the camera module.

The processing module 13 may output control signals to the camera module 12 to make the camera module 12 start working and capture images of the environmental scene.

At step S22: obtain multiple brightness data of the environmental scene based on the images.

After capturing images of the environmental scene through the camera module 12, the processing module 13 may obtain images corresponding to the environmental scene. The image includes multiple pixels, where the detection brightness value of each pixel corresponds to the brightness at the corresponding position in the environmental scene. Therefore, by obtaining the detection brightness values of multiple pixels in the image, the brightness data of corresponding positions in the environmental scene may be obtained.

In some embodiments, the processing module 13 may obtain the detection brightness value of each pixel to obtain multiple brightness data of the environmental scene within the imaging range of the camera module 12. The number of brightness data equals the number of pixels. The processing module 13 may also select a portion of all pixels and obtain the detection brightness values of these pixels to obtain multiple brightness data values for corresponding positions in the environmental scene.

At step S23: adjust the display brightness of the display module 11 based on the multiple brightness data.

Since the display module 11 of the virtual reality device 10 displays both environmental scenes and virtual scenes, to enhance user immersion and experience, the display brightness of the display module 11 needs to be adaptively adjusted according to the brightness of the environmental scene. Therefore, the processing module 13 may adjust the brightness of the display module 11 corresponding to the multiple brightness data values obtained from the environmental scene.

Figure 3:
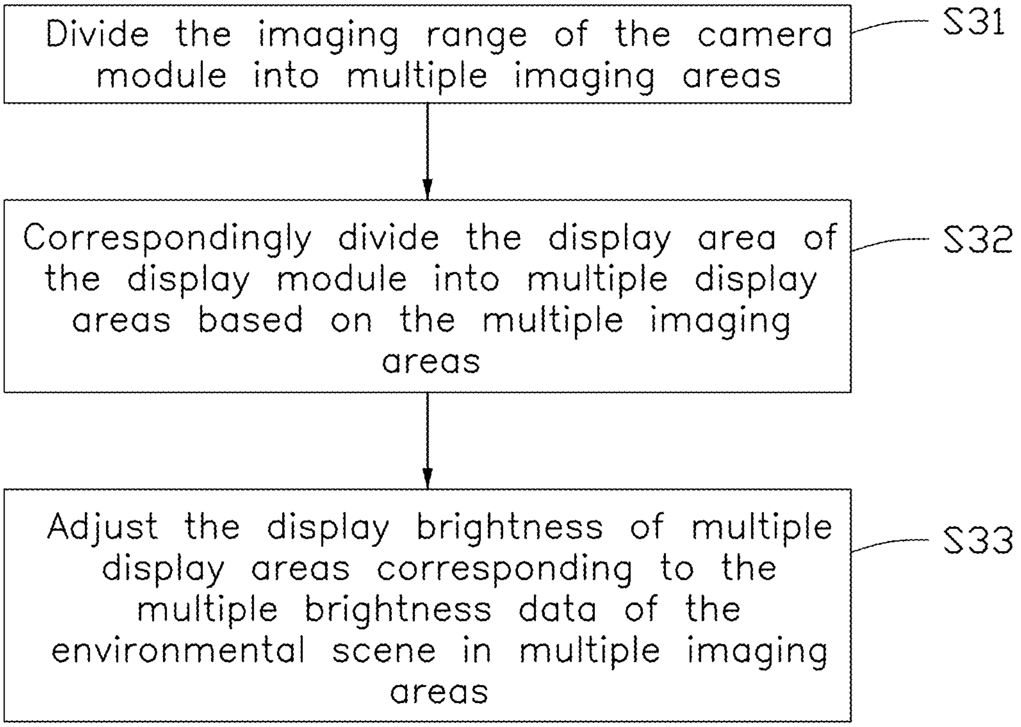
FIG. 3 is a flowchart of another embodiment of a brightness adjustment method according to the present application.

FIG. 3 is another flowchart of the brightness adjustment method provided by the present application. Step S23 of the brightness adjustment method may further include the following steps:

At step S31: divide the imaging range of the camera module 12 into multiple imaging areas.

The processing module 13 may divide the total imaging range of one or more cameras in the camera module 12 into multiple imaging areas, with each imaging area corresponding to a position area in the environmental scene.

For example, the processing module 13 may divide the imaging range of the first camera C1 from left to right into a first imaging area a1, a second imaging area a2, and a third imaging area a3, and the first imaging area a1, second imaging area a2, and third imaging area a3 may each correspond to one of the position areas in the environmental scene.

For another example, the processing module 13 may divide the sum of the imaging ranges of the first camera C1 and the second camera C2 from left to right into the first imaging area a1 to the sixth imaging area a6, the first imaging area a1, the second imaging area a2, and the third imaging area a3 are imaging areas divided from the imaging range of the first camera C1, and the fourth imaging area a4, the fifth imaging area a5, and the sixth imaging area a6 are imaging areas divided from the imaging range of the second camera C2. Since the imaging ranges of the first camera C1 and the second camera C2 may partially overlap, the same imaging area may correspond to different cameras, for example, the third imaging area a3 may correspond to the overlapping imaging area of the first camera C1 and the second camera C2.

At step S32: correspondingly divide the display area of the display module into multiple display areas based on the multiple imaging areas.

The processing module 13 may partition the display screen to obtain multiple display areas and establish the mapping relationships between the imaging areas and the display areas.

For example, when the processing module 13 divides the imaging range of the first camera C1 into the first imaging area a1, the second imaging area a2, and the third imaging area a3, the processing module 13 may further divide the display area of the corresponding display screen (such as the first display screen 111) of the first camera C1 into the first display area b1, the second display area b2, and the third display area b3 according to parameters such as area, order, arrangement position, shape, whether overlapping and overlapping area of the first imaging area a1, the second imaging area a2, and the third imaging area a3. The area ratios of the first imaging area a1, the second imaging area a2, and the third imaging area a3 to the entire imaging range of the first camera C1 may correspondingly equal the area ratios of the first display area b1, the second display area b2, and the third display area b3 to the entire display area of the first display screen 111.

For another example, when the processing module 13 divides the sum of the imaging ranges of the first camera C1 and the second camera C2 from left to right into the first imaging area a1 to the sixth imaging area a6, the processing module 13 may further divide the display areas of the corresponding display screens (such as the first display screen 111 and the second display screen 112) of the first camera C1 and the second camera C2 into the first display area b1 to the sixth display area b6 according to parameters such as area, order, arrangement position, shape, whether overlapping and overlapping area of the first imaging area a1 to the sixth imaging area a6. Since the imaging ranges of the first camera C1 and the second camera C2 may partially overlap, there may also be partial overlap between the first imaging area a1, the second imaging area a2, the third imaging area a3, the fourth imaging area a4, the fifth imaging area a5, and the sixth imaging area a6. Therefore, the processing module 13 may perform overall mapping between the sum of the imaging ranges of the first camera C1 and the second camera C2 and the sum of the display areas of the first display screen 111 and the second display screen 112, thereby establishing the mapping relationships between imaging areas and display areas.

Optionally, step S23 may further include the following step:

At step S33: adjust the display brightness of multiple display areas corresponding to the multiple brightness data of the environmental scene in multiple imaging areas.

After the processing module 13 obtains the imaging areas and the display area, and establishes the mapping relationships and matching relationships between multiple imaging areas and the display area, the processing module 13 may obtain the detection brightness values of the pixels of the corresponding imaging areas through the images captured by the camera module 12, thereby obtaining the actual brightness values of the environmental scene in corresponding imaging areas, i.e., the processing module 13 may obtain multiple brightness data of the environmental scene. Furthermore, the processing module 13 may adjust the display brightness of the display areas to match the brightness of corresponding environmental scenes based on the multiple brightness data of the environmental scene, corresponding imaging areas, and their mapped display areas. As such, this may enhance user immersion and experience.

Figure 4:
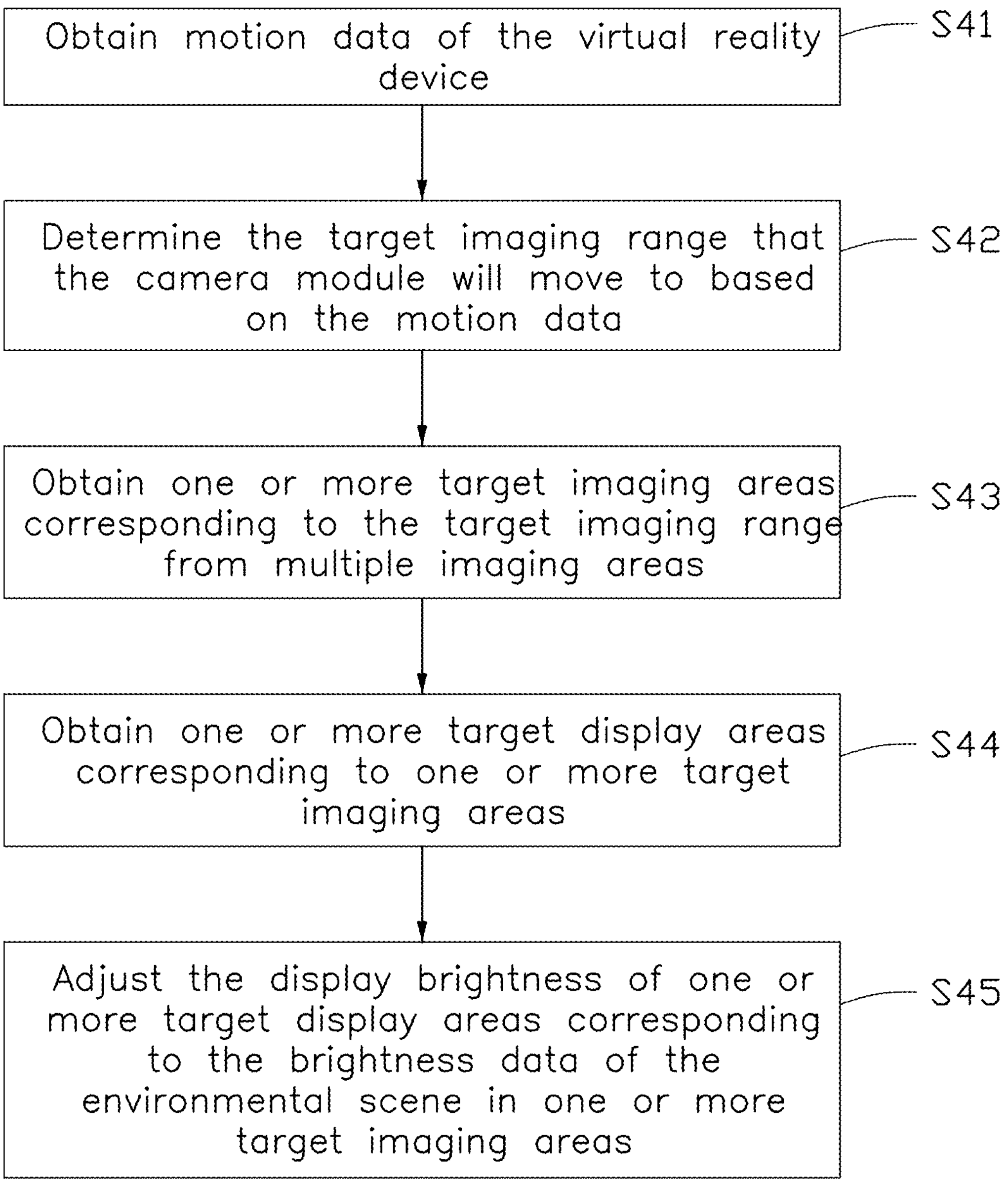
FIG. 4 is a flowchart of another embodiment of a brightness adjustment method according to the present application.

FIG. 4 is another flowchart of the brightness adjustment method provided by the present application. The brightness adjustment method provided by the present application may also include the following steps:

At step S41: obtain motion data of the virtual reality device.

The processing module 13 may obtain the motion data of the virtual reality device 10 through the inertial measurement module 14. The motion data may include attitude angle and acceleration, and the motion data may indicate the movement trend of the virtual reality device 10. Since the parts of the user wearing the virtual reality device 10 may move and rotate when the user uses the virtual reality device 10, the processing module 13 may predict the user's future destination by obtaining the motion data of the virtual reality device 10, the display brightness of the display module 11 may be pre-adjusted so that the display brightness of the display module 11 changes synchronously with the movement trend of the virtual reality device 10, so that the dynamic adaptability of the display module 11 may be improved and the user's experience may be enhanced.

At step S42: determine the target imaging range that the camera module will move to based on the motion data.

At step S43: obtain one or more target imaging areas corresponding to the target imaging range from the multiple imaging areas.

The processing module 13 may determine the user's future destination based on the motion data, and correspondingly determine the target imaging range that the camera module 12 will move to when the user reaches the destination.

For example, before the user moves, the imaging range of the camera module 12 may be divided into the first imaging area a1 to the sixth imaging area a6. When the user turns their head right and the camera module 12 moves right accordingly, the processing module 13 may obtain the attitude angle and acceleration of the virtual reality device 10 through the inertial measurement module 14, predict the user's destination, and correspondingly determine the target imaging range that the camera module 12 will move to. For example, if the processing module 13 predicts that the user's destination is 45 degrees turn to the right, the corresponding one or more target imaging areas from the multiple imaging areas would be the fourth imaging area a4 to the ninth imaging area a9. The seventh imaging area a7 to the ninth imaging area a9 may be newly divided areas arranged sequentially to the right from the sixth imaging area a6.

At step S44: obtain one or more target display areas corresponding to one or more target imaging areas.

For example, when the processing module 13 determines that the target imaging areas corresponding to the target imaging range are the fourth imaging area a4 to the ninth imaging area a9, the multiple target display areas corresponding to the fourth imaging area a4 to the ninth imaging area a9 shall remain respectively the first display area b1 to the sixth display area b6.

Step S23 may further include the following step:

At step S45: adjust the display brightness of one or more target display areas corresponding to the brightness data of the environmental scene in one or more target imaging areas.

The processing module 13 may adjust the display brightness of the target display areas to match the brightness of corresponding environmental scenes based on the multiple brightness data of the environmental scene, the target imaging areas, and the target display areas. For example, the processing module 13 may adjust the display brightness of the first display area b1 to match the brightness data of the environmental scene in the fourth imaging area a4, and so on.

In some embodiments, since the imaging range of the camera module 12 before user movement may not include the seventh imaging area a7 to the ninth imaging area a9, the processing module 13 may not have obtained multiple brightness data values for the environmental scenes corresponding to the seventh imaging area a7 to the ninth imaging area a9. Therefore, the processing module 13 may predict and assign values for multiple brightness data of environmental scenes in the seventh imaging area a7 to the ninth imaging area a9 by referencing multiple brightness data from other imaging areas. For example, the processing module 13 may predict multiple data for environmental scenes in the seventh imaging area a7 to the ninth imaging area a9 by referencing multiple brightness data from the environmental scene in the sixth imaging area a6, combined with the rate of change of multiple brightness data from environmental scenes in the fourth imaging area a4 to the sixth imaging area a6. For example, if the brightness data of the environmental scene in the sixth imaging area a6 is 180 lux, and the rate of change of multiple brightness data from environmental scenes in the fourth imaging area a4 to the sixth imaging area a6 is-20 lux/imaging area, the processing module 13 may predict that the brightness data of environmental scenes in the seventh imaging area a7 to the ninth imaging area a9 would be 160 lux, 140 lux, and 120 lux respectively. Alternatively, the processing module 13 may directly use multiple brightness data from the environmental scene in the sixth imaging area a6 as multiple brightness data for environmental scenes in the seventh imaging area a7 to the ninth imaging area a9.

Figure 5:
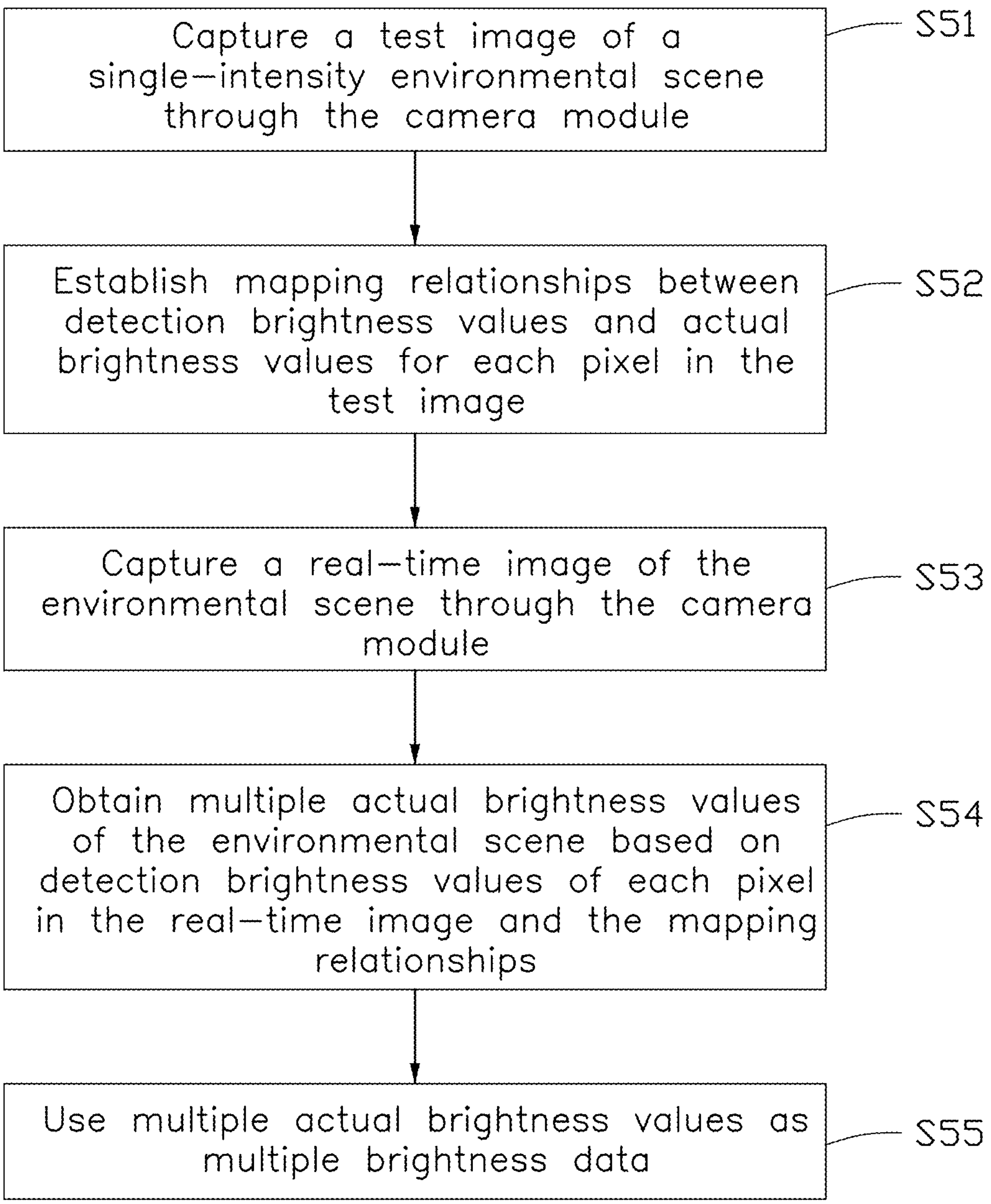
FIG. 5 is a flowchart of another embodiment of a brightness adjustment method according to the present application.

FIG. 5 is another flowchart of the brightness adjustment method provided by the present application. Before step S21, the brightness adjustment method provided by the present application may further include the following steps:

At step S51: capture test images of a single-intensity environmental scene through the camera module.

At Step S52: establish mapping relationships between detection brightness values and actual brightness values for each pixel in the test images.

The single-intensity environmental scene refers to an environmental scene with a single brightness level, such as a light panel or light source with uniform light intensity. Theoretically, in an image captured by the camera module 12 of a single-intensity environmental scene, the detection brightness value of each pixel should equal the brightness of the single-intensity environmental scene, such as the light intensity of a uniformly illuminating light panel. However, due to possible differences in detection performance and photosensitivity among pixels in the image sensor of the camera module 12, there may be pixels in the test image with detection brightness values that do not match the single brightness of the single-intensity environmental scene. Therefore, by setting up multiple single-intensity scenes and establishing the mapping relationships between detection brightness values of each pixel on the image sensor in the camera module 12 and actual brightness values of multiple single-intensity scenes, multiple brightness data in the images captured by the camera module 12 may be calibrated.

Step S21 may further include the following step:

At Step S53: capture real-time images of the environmental scene through the camera module.

Step S22 may further include the following steps:

At step S54: obtain multiple actual brightness values of the environmental scene based on detection brightness values of each pixel in the real-time images and the mapping relationships.

The detection brightness value is the brightness data output by the image sensor to the processing module 13 after the camera module 12 captures an image. The actual brightness value is the actual brightness data of the environmental scene. After obtaining the mapping relationships between detection brightness values and actual brightness values for each pixel in the test images, when the processing module 13 subsequently obtains detection brightness values for each pixel in the real-time images, it may match and calculate the actual brightness values of the environmental scene based on the mapping relationships.

At step S55: use multiple actual brightness values as multiple brightness data.

The multiple brightness data serve as the basis for the processing module 13 to adjust the display brightness of the display module 11.

Figure 6:
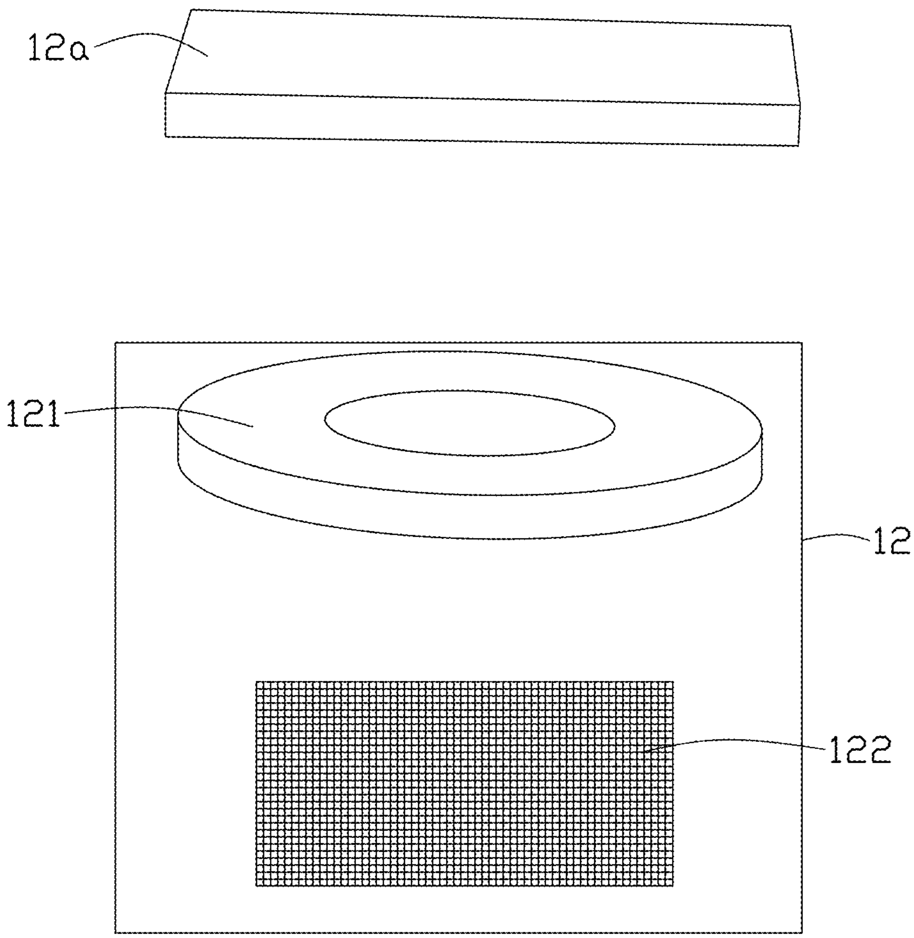
FIG. 6 is a structural diagram of a first camera according to the present application.

FIG. 6 is a schematic diagram of the first camera C1. The first camera C1 may include a lens 121 and an image sensor 122.

In the embodiment, a light panel 12*a* is suspended above the lens 121, the light panel 12*a* has uniform light intensity and thus may serve as a single-intensity environmental scene. The light panel 12*a* covers the range of the lens 121, thereby ensuring that the imaging range of the camera module 12 contains only the light panel 12*a*, thereby guaranteeing consistent detection brightness values for all pixels in the images captured by the camera module 12.

When the processing module 13 executes the brightness adjustment method shown in FIG. 5, after the camera module 12 captures an image of the light panel 12*a*, the image sensor 122 may obtain detection brightness values for each pixel in the image. This is illustrated here as an example with a luminous intensity of 8 for the light board 12*a* and an image size of 4 pixel dots*4 pixel dots:

Theoretically, the brightness values of all pixels in the image sensor 122 should be 8, as shown in Table 1:

TABLE 1

| | | | |
|---|---|---|---|
| 8 | 8 | 8 | 8 |
| 8 | 8 | 8 | 8 |
| 8 | 8 | 8 | 8 |
| 8 | 8 | 8 | 8 |

The value in each cell in Table 1 represents a detection brightness value of the pixel.

However, due to differences in photosensitivity among pixels in the image sensor 122, the detection brightness values for each pixel may differ, as shown in Table 2:5

TABLE 2

| | | | |
|---|---|---|---|
| 8 | 7 | 8 | 7 |
| 8 | 6 | 8 | 8 |

TABLE 2-continued

| | | | |
|---|---|---|---|
| 8 | 8 | 8 | 7 |
| 7 | 8 | 6 | 8 |

At this point, the processing module 13 may establish the mapping relationships between the detection brightness values of each pixel and the actual brightness values of the environmental scene, as shown in Table 3:

TABLE 3

| | | | |
|---|---|---|---|
| 8→8 | 7→8 | 8→8 | 7→8 |
| 8→8 | 6→8 | 8→8 | 8→8 |
| 8→8 | 8→8 | 8→8 | 7→8 |
| 7→8 | 8→8 | 6→8 | 8→8 |

The value before the arrow is the detection brightness value, and the value after the arrow is the actual brightness value after mapping. The processing module 13 may store these mapping relationships in memory, and the memory may be a memory structure included in the processing module 13, or the memory may be other electronic components with storage capabilities.

Thus, by adjusting different light intensities of the light panel 12*a*, the mapping relationships between detection brightness values of each pixel and multiple different light intensities (i.e., actual brightness values of the environmental scene) may be obtained, thereby enabling the processing module 13 to perform the brightness calibration of the camera module 12.

Figure 7:
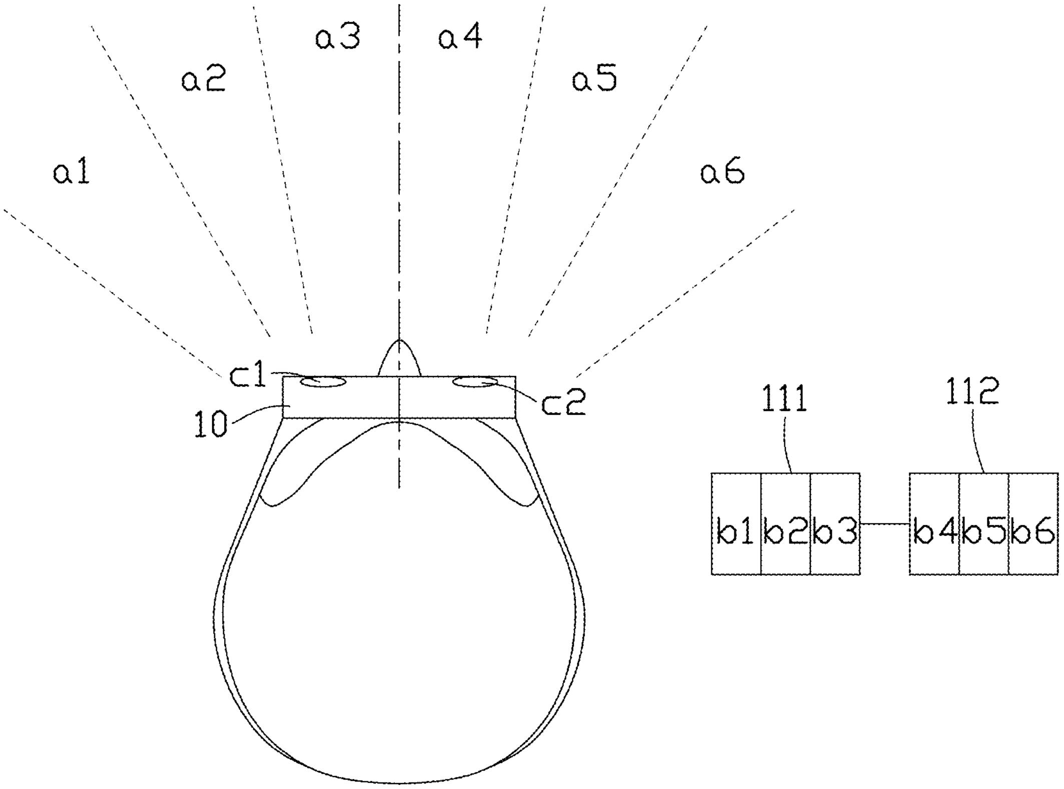
FIG. 7 is a schematic diagram of a camera area and a display area of the present application.

FIG. 7 is a schematic diagram of imaging areas and display areas. The camera module 12 includes the first camera C1 and the second camera C2, with their total imaging range divided from left to right into the first imaging area a1 to the sixth imaging area a6. The display range of the first display screen 111 on the display module 11 is divided from left to right into the first display area b1 to the third display area b3, and the display range of the second display screen 112 is divided from left to right into the fourth display area b4 to the sixth display area b6.

The processing module 13 may obtain the multiple brightness data corresponding to the first imaging area a1 to the sixth imaging area a6 from the images and adjust the display brightness of the display areas accordingly. For example, the processing module 13 may adjust the display brightness of the first display area b1 to match the brightness data of the first imaging area a1.

Figure 8A:
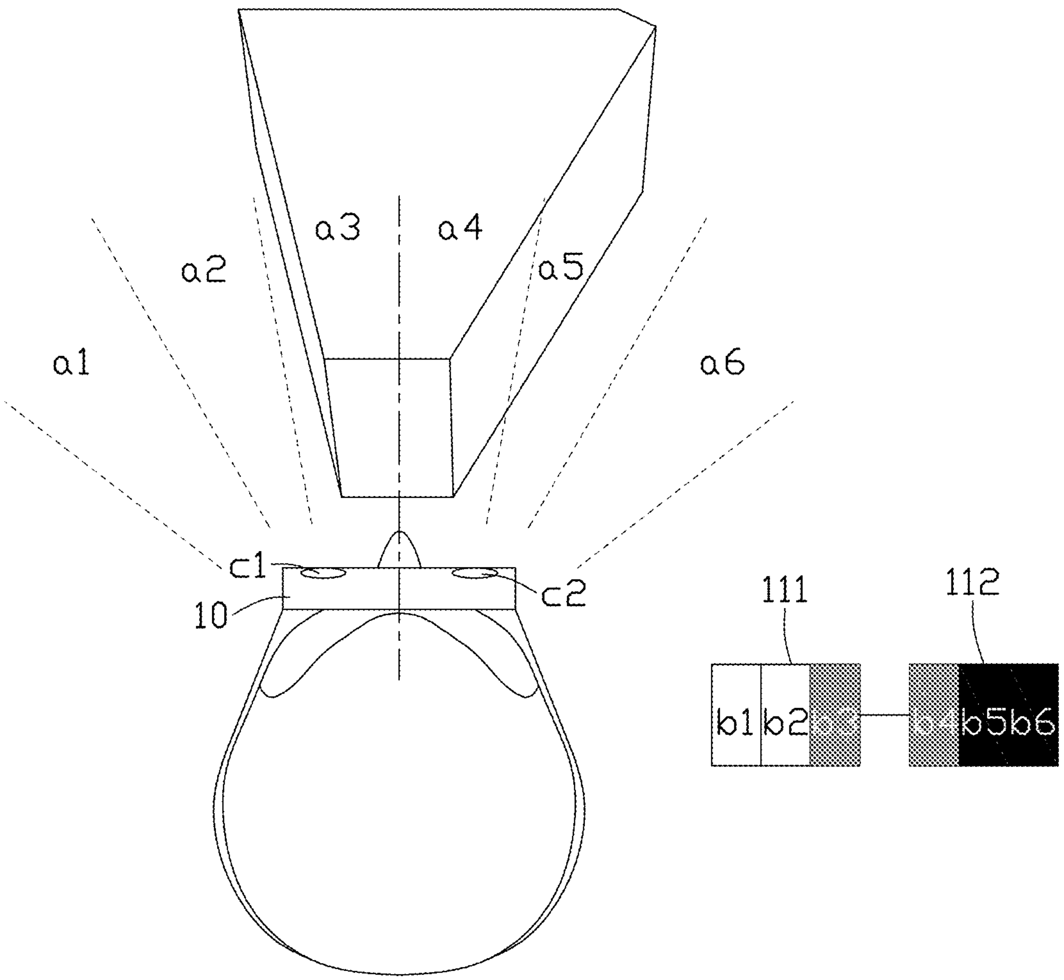
FIG. 8A is a schematic diagram of one application of the virtual reality device of the present application under the change of brightness in the environmental scene.

FIG. 8A shows an application example of the virtual reality device 10 under the change of brightness in the environmental scene. As shown in FIG. 8A, there is an obstacle 16 in the areas of third imaging area a3 and the fourth imaging area a4, the incident light is directed diagonally from the top of the obstacle 16, as shown by the direction of the arrow, such that the actual brightness of the environmental scene in the first imaging area a1 and the second imaging area a2 is high, the actual brightness of the environmental scene in the third imaging area a3 with the fourth imaging area a4 is medium, and the actual brightness of the environmental scene in the fifth imaging area a5 and the sixth imaging area a6 is low. Therefore, the processing module 13 may adjust the first display area b1 and the second display area b2 to higher display brightness, adjust the third display area b3 and the fourth display area b4 to medium display brightness, and adjust the fifth display area b5 and the sixth display area b6 to lower display brightness.

Figure 8B:
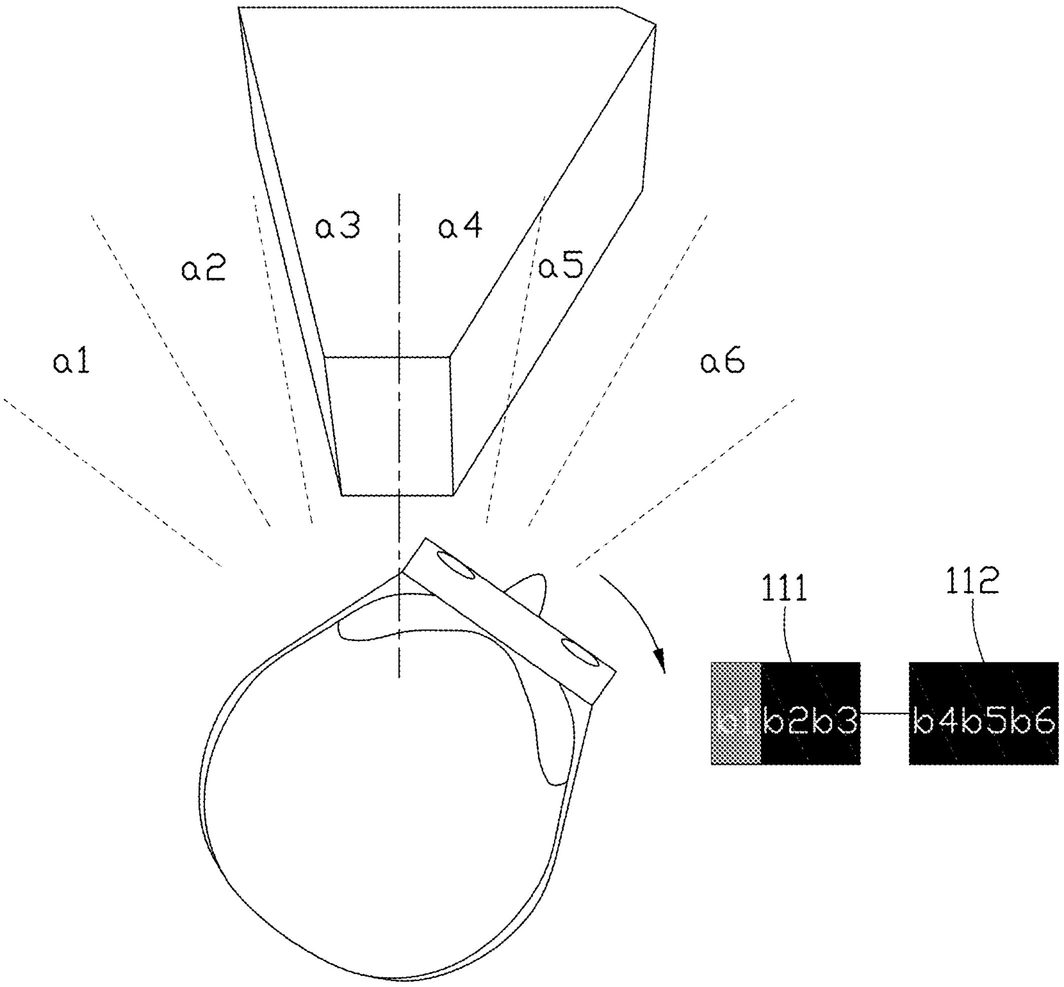
FIG. 8B is a schematic diagram of another application of the virtual reality device of the present application under the change of brightness in the environmental scene.

FIG. 8B shows another application example of the virtual reality device 10 under the change of brightness in the environmental scene. As shown in FIG. 8B, after the user wears the virtual reality device 10, their head rotates to the right.

Before rotation, as shown in FIG. 8A, the processing module 13 may adjust the first display area b1 and the second display area b2 to higher display brightness, adjust the third display area b3 and the fourth display area b4 to medium display brightness, and adjust the fifth display area b5 and the sixth display area b6 to lower display brightness.

During rotation, the inertial measurement module 14 may obtain the attitude angle and the acceleration of the virtual reality device 10 and transmits the attitude angle and the acceleration to the processing module 13. The processing module 13 predicts that the user's movement destination is 45 degrees to the right, and the one or more target imaging areas corresponding to the target imaging range from the multiple imaging areas are the fourth imaging area a4 to the ninth imaging area a9. The seventh imaging area a7 to the ninth imaging area a9 may be newly divided areas arranged sequentially to the right from the sixth imaging area a6, which are not shown in the figure.

Then, the processing module 13 may determine that the target display areas remain as the first display area b1 to the sixth display area b6, and adjust their brightness respectively corresponding to the brightness data from the fourth imaging area a4 to the ninth imaging area a9.

Since the processing module 13 may not have obtained multiple brightness data values for environmental scenes corresponding to the seventh imaging area a7 to the ninth imaging area a9, the processing module 13 may predict and assign values for multiple brightness data of environmental scenes in the seventh imaging area a7 to the ninth imaging area a9 by referencing multiple brightness data from other imaging areas. This may include, but is not limited to, brightness data from single imaging areas and/or brightness data value trends from multiple imaging areas. the embodiment may take an example where the processing module 13 uses the brightness data from the environmental scene in the sixth imaging area a6 as multiple brightness data for environmental scene corresponding to the seventh imaging area a7 to the ninth imaging area a9.

In summary, when the user's head rotates to the right, the processing module 13 may:

Adjust the display brightness of the first display area b1 to medium level by referencing the brightness data from the environmental scene in the fourth imaging area a4;

Adjust the display brightness of the second display area b2 and the third display area b3 to lower level by referencing the brightness data from environmental scenes in the fifth imaging area a5 and the sixth imaging area a6;

Adjust the display brightness of the fourth display area b4 to the sixth display area b6 to lower level by referencing the brightness data from environmental scenes in the seventh imaging area a7 to the ninth imaging area a9.

Those of ordinary skill in the art should realize that the above embodiments are only used to illustrate the present application, but not to limit the present application. As long as they are within the essential spirit of the present application, the above embodiments are appropriately made and changes fall within the scope of protection of the present application.

What is claimed is:

1. A brightness adjustment method applied to a virtual reality device, wherein the virtual reality device comprises a display module and a camera module, the display module is configured to display an environmental scene, the environmental scene comprises a real environment and a real object, the brightness adjustment method comprises:

capturing images through the camera module, obtaining multiple brightness data of the environmental scene according to the images, and adjusting display brightness of the display module according to the multiple brightness data;

wherein before obtaining the multiple brightness data of the environmental scene according to the images, the brightness adjustment method further comprises:

capturing test images of a single-intensity environmental scene through the camera module; and establishing mapping relationships between detection brightness values and actual brightness values for each pixel in the test images.

2. The brightness adjustment method of claim 1, wherein the adjusting display brightness of the display module according to the multiple brightness data, comprises:

dividing an imaging range of the camera module into multiple imaging areas;

dividing a display area of the display module into multiple display areas according to the multiple imaging areas; and adjusting the display brightness of the multiple display areas corresponding to the multiple brightness data of the environmental scene in the multiple imaging areas.

3. The brightness adjustment method of claim 2, further comprising:

obtaining motion data of the virtual reality device;

determining a target imaging range that the camera module is projected to move to according to the motion data;

obtaining one or more target imaging areas corresponding to the target imaging range from the multiple imaging areas; and obtaining one or more target display areas corresponding to the one or more target imaging areas.

4. The brightness adjustment method of claim 3, wherein the adjusting display brightness of the display module according to the multiple brightness data, further comprises:

adjusting the display brightness of the one or more target display areas according to the brightness data of the one or more target imaging areas.

5. The light emitting control circuit of claim 1, wherein the obtaining the multiple brightness data of the environmental scene according to the images, further comprises:

capturing real-time images of the environmental scene through the camera module;

obtaining multiple actual brightness values of the environmental scene according to the detection brightness values of each pixel in the real-time images and the mapping relationships;

applying the multiple actual brightness values as multiple brightness data.

6. A virtual reality device comprising:

a display module configured for displaying an environmental scene, wherein the environmental scene comprises a real environment and a real object, a camera module configured for capturing images through the camera module, and a processing module configured for obtaining multiple brightness data of the environmental scene according to the images and adjusting display brightness of the display module according to the multiple brightness data;

wherein before obtain the multiple brightness data of the environmental scene according to the images, the processing module is further configured to:

capture test images of a single-intensity environmental scene through the camera module; and establish mapping relationships between detection brightness values and actual brightness values for each pixel in the test images.

7. The virtual reality device of claim 6, wherein the processing module is further configured to:

divide an imaging range of the camera module into multiple imaging areas;

divide a display area of the display module into multiple display areas according to the multiple imaging areas; and adjust the display brightness of the multiple display areas corresponding to the multiple brightness data of the environmental scene in the multiple imaging areas.

8. The virtual reality device of claim 7, wherein the processing module is further configured to:

obtain motion data of the virtual reality device;

obtain a target imaging range that the camera module is projected to move to according to the motion data;

obtain one or more target imaging areas corresponding to the target imaging range from the multiple imaging areas; and obtain one or more target display areas corresponding to the one or more target imaging areas.

9. The virtual reality device of claim 8, wherein the processing module is further configured to:

adjust the display brightness of the one or more target display areas according to the brightness data of the one or more target imaging areas.

10. The virtual reality device of claim 6, wherein the processing module is further configured to:

capture real-time images of the environmental scene through the camera module;

obtain multiple actual brightness values of the environmental scene according to the detection brightness values of each pixel in the real-time images and the mapping relationships;

apply the multiple actual brightness values as multiple brightness data.

11. The virtual reality device of claim 6, further comprising a housing, wherein the display module and the camera module are disposed on the housing, the camera module comprises two cameras, the two cameras are spaced apart from the display module, and the two cameras are respectively disposed on the housing on both sides of the display module.

12. The virtual reality device of claim 11, wherein each of the two cameras is an ultra-wide angle camera.

13. A virtual reality device comprising:

a display module configured for displaying an environmental scene, wherein the environmental scene comprises a real environment and a real object, a camera module configured for capturing images through the camera module, and a processing module configured for obtaining multiple brightness data of the environmental scene according to the images and adjusting display brightness of the display module according to the multiple brightness data;

wherein the virtual reality device further comprises a housing, the display module and the camera module are disposed on the housing, the camera module comprises two cameras, the two cameras are spaced apart from the display module, and the two cameras are respectively disposed on the housing on both sides of the display module;

wherein the processing module is further configured to:

divide an imaging range of the camera module into multiple imaging areas;

divide a display area of the display module into multiple display areas according to the multiple imaging areas;

adjust the display brightness of the multiple display areas corresponding to the multiple brightness data of the environmental scene in the multiple imaging areas;

capture test images of a single-intensity environmental scene through the camera module; and establish mapping relationships between detection brightness values and actual brightness values for each pixel in the test images.

14. The virtual reality device of claim 13, wherein the processing module is further configured to obtain motion data of the virtual reality device;

obtain a target imaging range that the camera module is projected to move to according to the motion data;

obtain one or more target imaging areas corresponding to the target imaging range from the multiple imaging areas; and obtain one or more target display areas corresponding to the one or more target imaging areas.

15. The virtual reality device of claim 14, wherein the processing module is further configured to:

adjust the display brightness of the one or more target display areas according to the brightness data of the one or more target imaging areas.

16. The virtual reality device of claim 13, wherein the processing module is further configured to:

capture real-time images of the environmental scene through the camera module;

obtain multiple actual brightness values of the environmental scene according to the detection brightness values of each pixel in the real-time images and the mapping relationships;

apply the multiple actual brightness values as multiple brightness data.

17. The virtual reality device of claim 13, wherein each of the two cameras is an ultra-wide angle camera.

* * * * *